3,365,513
CONVERSION OF OLEFINS

Louis F. Heckelsberg, Bartlesville, Okla., assignor to Phillips Petroleum Company, a corporation of Delaware
No Drawing. Continuation-in-part of application Ser. No. 307,371, Sept. 9, 1963. This application Nov. 22, 1965, Ser. No. 509,146
9 Claims. (Cl. 260—683)

This application is a continuation-in-part of my application Ser. No. 307,371, filed Sept. 9, 1963, now abandoned.

This invention relates to the disproportionation of olefin hydrocarbons. In one aspect it relates to a process for disproportionating olefins having 3 to 20 carbon atoms per molecule with a catalyst comprising silica and tungsten oxide or molybdenum oxide. In another aspect it relates to a process for disproportionating propylene to produce ethylene and butenes by contact with a catalyst comprising silica and tungsten oxide. In another aspect is relates to a process for disproportionating propylene by contact with a catalyst comprising silica and molybdenum oxide.

By disproportionation according to this invention is meant the conversion of a hydrocarbon into similar hydrocarbons of both higher and lower number of carbon atoms. When propylene is disproportionated approximately equimolar quantities of ethylene and butenes are produced.

An object of this invention is to convert an aliphatic monoolefin to similar olefins of higher and lower numbers of carbon atoms.

Another object of this invention is to produce ethylene and butenes from propylene.

Other aspects, objects and the advantages of my invention are apparent in the written description and the claims.

According to this invention aliphatic olefins are disproportionated by contacting with a catalyst comprising tungsten oxide or molybdenum oxide and a silica containing base. Further according to this invention non-tertiary-base aliphatic olefins, that is, single olefins or mixtures of olefins, having from 3 to 20 carbon atoms per molecule are disproportionated by contacting with such a catalyst. Excellent results are obtained when such olefins having from 3 to 6 carbon atoms per molecule, especially propylene, are disproportionated by contacting with such a catalyst. By "non-tertiary-base" olefin, I means an olefin having no carbon-chain branching at a doubly bound carbon atom, that is, a carbon atom connected to another carbon atom by a double bond. Some examples of olefins suitable for disproportionating include propylene, 1-butene, isobutene, 2-butene, 1-pentene, 2-pentene, 1-hexene, 2-heptene, 1-octene, 2-nonene, 1-dodecene, 2-tetradecene, 1-hexadecene, 2-methyl-1-butene, 2-methyl-2-butene, 3-methyl-1-butene, 1-phenyl-butene-2, 4-octene, 3-eicosene and 3-heptene.

The silica component of the catalyst can be any conventional catalyst grade silica. Some examples are precipitated silica gel, microspheroidal silica, flame hydrolyzed silica, and silica aerogels. These materials have appreciable surface area, usually in the range of 50 to 700 m.$^2$/g., and can range from fine powders to coarse granules. These materials often contain small amounts of compounds of aluminum and of sodium, in the order of a few tenths of a percent by weight, and smaller. Trace amounts of other metals, and such small amounts of these materials are acceptable.

Silica-alumina bases are known to have catalytic activity for various hydrocarbon reactions, such as cracking and polymerization. These reactions can be avoided in the present process by maintaining the alumina content below about 1 percent by weight, preferably below about ½ percent.

Bases having larger amounts of alumina can be utilized for disproportionation, but conditions must be selected to avoid undesired reactions. Such reactions can be avoided by using suitably low reaction temperatures and avoiding excessively long contact times. By careful selection of conditions, high conversion and high efficiency of disproportionation can be obtained with relatively high proportions of alumina in the base, for example, bases such as silica-aluminas which are conventional cracking or polymerization catalysts, and even with bases with larger proportions of alumina, including compositions which are preponderantly alumina. The catalysts of this invention can contain other materials which do not substantially promote unwanted reactions. For example, the base can contain substantial amounts of magnesium oxide, or other inert materials in amounts which do not change the essential characteristics of the disproportination reaction.

The catalysts of this invention can be prepared by incorporating into a silica-containing base suitable tungsten or molybdenum compounds, by conventional methods such as, for example, impregnation, dry mixing, or co-precipitation. Suitable tungsten and molybdenum compounds include tungsten oxide and molybdenum oxide, and compounds convertible to these oxides. The finished catalyst can be in the form of powders, granules, agglomerates, pellets, spheres, extrudates, and the like, depending upon the type of contacting technique employed in the reaction.

Sufficient promoter is used to obtain the desired activity. Since the molybdenum and tungsten compounds usually are more expensive than the base material, unnecessarily large amounts are ordinarily not used. Generally the finished catalyst contains from 0.1 percent to 30 percent by weight of the selected promoter, calculated as the metal trioxide. However, larger amounts can be used and the molybdenum or tungsten is assumed to be present in the finished catalyst as trioxide merely for convenience in calculation. The invention is not limited to the trioxides nor to any other theory. In most instances, a proper amount of the promoter is from 1 percent to 20 percent. Excellent results have been obtained with silica-base catalysts containing about 2 to 15 percent by weight of tungsten oxide. In some instances excellent conversion and selectivity to desired products are obtained in the range of 6 to 12 percent by weight. Both tungsten oxide and molybdenum oxide can be used together to prepare a catalyst.

The catalysts of this invention are activiated by heat treatment at temperatures of from 600° to 1500° F. for a period of 1 second to 25 hours or more, shorter times being used with higher temperatures and longer times with lower temperatures. Excellent results are obtained by heat treatment of the fresh catalyst, prior to introduction of the feed, to convert the tungsten or molybdenum compound to the oxide, to dry the catalyst, or otherwise to activate the catalyst. A convenient and economical treatment is obtained by subjecting the catalyst to contact with a stream of air at a temperature in the range of 900° to 1200° F. for from 15 minutes to 5 hours. Other gases, which do not poison the catalyst, for example, nitrogen, also can be used, either as a substitute for air-treatment, or as a subsequent flush. Treatment with carbon monoxide or hydrogen during activation is permissible but contact of the tungsten oxide catalysts with hydrogen sulfide or sulfur dioxide is harmful. The catalyst also can be activated in the presence of a hydrocarbon, for example by heating in the presence of the feed. Where the operating temperature is sufficiently high, the initial portion of the run will activate the catalyst. Air is usually preferred for activation, since it is readily available.

Improvements can be obtained by treatment of the catalyst with a reducing gas which does not poison for disproportionation activity or which is not otherwise undesirable. Treatment with carbon monoxide or hydrogen can result in increased reaction rates or improved selectivity for disproportionation products or both. Carbon monoxide treatment generally gives higher conversions than hydrogen treatment. However, for propylene conversion, a hydrogen treatment gives improved selectivity for ethylene and butene.

In the practice of this invention, the catalyst can be used, without regeneration, for runs up to 50 hours or more, and can be regenerated repeatedly without appreciable damage. The regeneration can be accomplished, for example, by contact with diluted air, to remove accumulated coke. The conditions are controlled, by suitable flushing with inert gas before and after the coke combustion step, and by controlling the oxygen content of the regeneration gas, to avoid too rapid or uncontrolled heating. The regeneration temperature should be held below about 1200° F. to avoid catalyst damage. Gas from an inert gas generator, nitrogen, steam, or other gases which are inert to the catalyst at regeneration conditions, can be used to control the regeneration temperature.

The operating temperature for the process of this invention to disproportionate propylene using silica-base catalysts, is in the range of 400° to 1100° F. When using a tungsten oxide promoted catalyst, undesired competing reactions can be avoided by holding the operating temperature below about 1000° F. With a molybdenum oxide catalyst, good activity can be obtained above about 600° F. Excellent results are obtained with tungsten oxide catalysts in the range of 600° to 900° F., and with molybdenum oxide catalysts in the range of 800° to 1000° F. Selecting an operating temperature in the higher portions of these ranges makes the catalyst bed less susceptible to poisoning and promotes more rapid recovery from a temporary reduction in activity due to a transient exposure to activity reducing impurities in the feed. In many instances, an operating temperature at or near regeneration temperature can be selected, thus reducing or eliminating costly and time consuming cooling and heating cycles. For higher olefins, the preferred temperature ranges are somewhat lower.

Generally, the disproportionation reaction of this invention is essentially independent of pressure, except as pressure affects the density of the feed and thus the contact time. Pressures in the range of 0 to 1500 p.s.i.g. and higher are suitable. However, particularly with higher olefins, especially olefins having at least 5 carbon atoms per molecule, operation at pressures in the lower portion of the range, i.e., below 100 p.s.i.g., preferably in the range of 0–50 p.s.i.g., reduces the tendency to form products more highly branched than the starting material. For conversion of propylene, lower pressures, below about 100 p.s.i.g., when using tungsten oxide promoted catalysts, results in a reduction in activity at a given temperature and contact time. With a molybdenum oxide catalyst, higher pressures tend to increase coke formation on the catalyst when converting propylene. Best operation has been obtained below about 500 p.s.i.g.

The operable range of contact time for this invention process depends primarily upon the operating temperatures and the activity of the catalyst, which is influenced by surface area, promoter concentration, activation, temperature, etc. In general, undesired reactions are favored by longer contact times. Therefore, the contact time should be maintained as short as possible, consistent with desired disproportionation conversion. In this way, conversion due to unwanted reactions can be maintained at a desired low level, and high efficiencies obtained. Conditions and contact times can be selected to attain efficiency of conversion of propylene to ethylene and butenes consistently above 95 percent. In general, lower space rates are associated with lower temperatures.

In general, contact times in the range of 0.1 to 60 seconds can be used and contact times in the range of 1 to 60 seconds are suitable in many instances. With a fixed bed reactor, continuous flow operation at pressures in the range of about 500 p.s.i.g., with catalysts having a density of about 0.44 gram per cc. and a surface area of about 200 to 400 m.²/g., and at temperature of 600° to 1000° F., weight hourly space velocities in the range of 0.5 to 1000 parts by weight of hydrocarbon feed per part by weight of catalyst per hour are suitable, with excellent results having been obtained in the range of 1 to 500, higher conversion being obtained in the range of 1 to 200. Comparable space rates expressed in volumes of feed at reaction conditions per volume of catalyst per minute are in the range of 0.1 to 1000, and preferably 1 to 100. These rates remain constant for changes in density of the feed due to changes in pressure or temperature, but must be adjusted according to the activity of the catalyst and the reaction temperature. At a given temperature, space rate can be varied appreciably, within the stated limits, without substantial loss of efficiency. Space rates are also given in this application in volume of feed (STP) per minute per unit volume of catalyst.

Maximum disproportionation of propylene with a minimum of other conversions is obtained by selecting conditions at a given temperature such that the equilibrium conversion of the reaction $$2C_3H_6 \rightarrow C_4H_8 + C_2H_4$$

is approached. In the temperature range of this invention, equilibrium conversion of propylene is about 40 to 45 percent. Space rates lower than those required for approaching equilibrium tend to reduce efficiency of conversion to ethylene and butenes.

Disproportionation according to this invention can be carried out either as a batch operation or continuously, using a fixed catalyst bed, stirred mixture, fluidized catalyst, moving catalyst bed, or other contacting method.

Following the reaction period, the hydrocarbons and solid catalyst are separated and the disproportionation products recovered. The products can be separated from each other by fractionation, solvent extraction, adsorption, etc. Unconverted feed, diluents, or unwanted products can be removed or recycled.

If desired, paraffinic and cycloparaffinic hydrocarbons having up to about 12 carbon atoms per molecule can be employed as diluents for the reaction of this invention. The diluent should be non-reactive under the conditions of the reaction. Propane is a suitable diluent for the disproportionation of propylene.

The feed should be essentially free of impurities which adversely affect the reaction. For example, small amounts of water or air can be tolerated with some reduction of conversion but should be held to a minimum consistent with economical treatment of the feed. The effect due to air or water is temporary, so that the effect of a transient exposure is removed when the exposure is discontinued, more rapid recovery being obtained at higher operating temperatures. Diolefinic and acetylenic impurities tend to form coke readily and necessitate more frequent regeneration of the catalyst.

The following examples illustrate the practice of this invention, but are not intended to unduly limit the invention. Throughout these examples, unless otherwise stated, the analyses are in weight percent.

*Example I*

A macroporous, low-sodium, low-alumina silica base, having about 0.05 weight percent Na₂O and about 0.1 weight percent alumina, a surface area of 374 m.²/g., an average pore diameter of 25 A., and a bulk density of 0.44 kg./l., originally in the form of 4-mm. beads, was crushed to 20–40 mesh size. The support was impregnated with aqueous ammonium tungstate. After drying and activation at 1100° F. for 1 hour in air, the finished catalyst contained about 3 weight percent tungsten oxide.

A fixed bed of this catalyst was formed in a stainless-steel reactor and contacted with a feed comprising 60 weight percent propylene and 40 weight percent propane at 800° F., 450 p.s.i.g., and at a space rate of about 120 vol./vol./min. (STP). A sample of the effluent gas was taken near the beginning of a continuous 6-hour run, and analyzed. The conversion of propylene to ethylene and butenes was calculated, based on the gaseous reactor effluent. The analysis, corrected for propane, which was essentially unconverted, is tabulated in weight percent.

Ethylene _____ 15.8
Propylene _____ 55.2
1-butene _____ 9.3
trans-2-butene _____ 11.5
cis-2-butene _____ 8.2
Conversion, percent _____ 44.8

Conversion to coke and heavy products was less than 2 percent by weight of the propylene feed.

This example shows very high conversion of propylene to ethylene and butenes, with a very small conversion to undesired products, using a tungsten oxide on silica catalyst.

Example II

Propylene was disproportionated over a catalyst containing about 10 weight percent molybdenum oxide with the remainder being a commercially available flame-hydrolyzed silica which was essentially non-porous with a surface area of about 175 m.$^2$/g. and a particle size of about 0.02 micron. This was a high-purity material containing more than 99 percent silica.

A 37.0 gram quantity of the above-described silica was slurried with 3.66 grams of ammonium molybdate in about 200 ml. of water forming a paste. This paste was then dried for several hours over a steam bath and then in an oven at about 120° C. The dried material was broken up and a 20–40 mesh fraction was retained for further use. The catalyst was activated by forming a bed of this material, preceded by a bed of glass beads, in a glass reactor, and heating at 1000° F. for 4 hours in the presence of dry flowing air. The air was followed by a flow of nitrogen and the bed cooled to reaction temperature. The catalyst, containing about 10 weight percent molybdenum oxide, was contacted with a stream of propylene at atmospheric pressure, a temperature of 1000° F. at a space rate of 10 vol./vol./min. (STP). The following data were obtained:

| Time (minutes) | 10 | 22 | 35 | 55 | 85 | 115 | 145 | 175 |
|---|---|---|---|---|---|---|---|---|
| Ethylene | 8.9 | 10.5 | 11.0 | 10.6 | 9.5 | 9.0 | 8.5 | 8.2 |
| Propylene | 76.7 | 72.8 | 71.7 | 72.3 | 74.8 | 75.9 | 77.2 | 78.2 |
| 1-butene | 4.3 | 5.1 | 5.4 | 5.1 | 4.5 | 4.3 | 4.0 | 3.7 |
| Trans-2-butene | 5.7 | 6.6 | 6.9 | 6.9 | 6.4 | 6.2 | 5.9 | 5.7 |
| Cis-2-butene | 4.4 | 5.0 | 5.0 | 5.1 | 4.8 | 4.6 | 4.4 | 4.2 |

The catalyst then was regenerated, also at 1000° F., by flushing with nitrogen for 10 minutes, contacting with air for 55 minutes, flushing with nitrogen for 10 minutes and with propylene for 5 minutes. The run was started under the same conditions as above and the following data were obtained:

| Time (minutes) | 10 | 20 |
|---|---|---|
| Ethylene | 9.6 | 10.6 |
| Propylene | 74.9 | 72.3 |
| 1-butene | 4.9 | 5.5 |
| Trans-2-butene | 6.1 | 6.7 |
| Cis-2-butene | 4.5 | 4.9 |

This example shows high conversion of propylene to ethylene and butenes, and effective regeneration of the catalyst, using a molybdenum-oxide-on-silica catalyst.

Example III

Propylene was disproportionated over a silica catalyst containing about 10 weight percent molybdenum oxide which was identical to the catalyst used in Example II. However, the catalyst was not separately activated. The dried and screened catalyst was charged into the glass reactor, contacted with flowing propylene and heated to 950° F. Except for the lack of a separate activation step, the propylene disproportionation was carried out under essentially the same conditions as those described in Example II. The analytical results from the examination of the effluent during a number of hours of operation are seen below.

| | Temperature, ° F. | | | | | | |
|---|---|---|---|---|---|---|---|
| | 950 | 950 | 950 | 950 | 950 | 950 | 950 |
| Time (minutes) | 37 | 60 | 90 | 120 | 180 | 240 | 300 |
| Ethylene | 2.3 | 4.8 | 7.6 | 7.2 | 6.1 | 5.3 | 4.9 |
| Propylene | 94.8 | 87.0 | 79.0 | 79.9 | 83.1 | 84.1 | 86.4 |
| 1-butene | 1.0 | 2.4 | 3.7 | 3.5 | 2.8 | 2.3 | 2.1 |
| Trans-2-butene | 1.1 | 3.3 | 5.5 | 5.3 | 4.5 | 4.1 | 3.7 |
| Cis-2-butene | 0.8 | 2.5 | 4.2 | 4.1 | 3.5 | 3.2 | 2.9 |

This example shows that separate preliminary activation can be omitted.

Example IV

Propylene was disproportionated over a catalyst comprising oxide on silica. A macroporous, low-sodium, low-alumina base, having about 0.05 weight percent Na$_2$O and about 0.1 weight percent alumina, a surface area of 374 m.$^2$/g., a pore diameter of 25 A., in the form of 1/16–1/8 inch beads, was impregnated with ammonium molybdate. Small amounts of a saturated solution of ammonium molybdate in methyl alcohol was added to the beads, with drying over a steam bath between additions. After the final addition, the beads were dried in an oven for several hours and weighed. The increase in weight indicated about 2½ weight percent of molybdenum oxide on the silica.

The finished catalyst was charged to form a bed in a glass reactor and treated with air at 1000° F. for 1 hour, followed by flushing with nitrogen for 10 minutes. Propylene was fed through the reactor at atmospheric pressure and a temperature of 1000° F. at a space rate of 10 vol./vol./min. (STP). The gaseous products were analyzed and the following data obtained:

| Time (minutes) | 4 | 19 | 34 | 49 | 64 | 94 | 124 |
|---|---|---|---|---|---|---|---|
| Ethylene | 4.5 | 9.6 | 9.9 | 9.8 | 9.7 | 8.9 | 8.8 |
| Propylene | 87.8 | 73.2 | 72.2 | 72.4 | 72.6 | 74.4 | 74.9 |
| 1-butene | 2.5 | 5.2 | 5.3 | 5.2 | 5.2 | 4.7 | 4.7 |
| 2-butene | 2.9 | 6.8 | 7.1 | 7.1 | 7.0 | 6.7 | 6.5 |
| cis-2-butene | 2.3 | 5.2 | 5.5 | 5.5 | 5.5 | 5.3 | 5.1 |

Conversion to coke and heavy products was less than 2 percent of the propylene feed.

This example shows high conversion of propylene to ethylene and butenes, with a very small conversion to undesired products, using a molybdenum-oxide-on-silica catalyst.

Example V

In another run, propylene was disproportionated over a tungsten oxide catalyst supported on a commercially available catalytic grade silica-alumina composed of about 88 weight percent silica and 12 weight percent alumina. The catalyst was prepared by impregnating the base with an aqueous solution of (NH$_4$)$_2$W$_4$O$_{13}$·8H$_2$O. The composite was then dried and activated by heating in a flowing stream of dry air for 2 hours at 1100° F.

The activated catalyst was then transferred to a stainless steel reactor equipped for temperature and pressure control. A 60:40 (by weight) mixture of propylene:propane was used as the feed. The reaction was carried out at a pressure of 450 p.s.i.g. and a gaseous space rate of 120 vol./vol./min. (STP). The effluent gases were periodically analyzed. The results of the test are seen in the table below:

monoxide as treating agents. A single $WO_3$–$SiO_2$ catalyst, containing about 6.9 weight percent tungsten oxide was used for all the tests, being regenerated with air between tests. The catalysts were tested in propylene disproportionation runs carried out in a fixed bed reactor at 800–825° F., 450 p.s.i.g., and 70 WHSV. The results of these tests, showing the effects of hydrogen or carbon monoxide treatment under different conditions, are shown in the table above.

| Catalyst Treatment | | | Propylene Conversion, percent | | | Selectivity, Percent | Yield of 1-$C_4$=, Percent |
|---|---|---|---|---|---|---|---|
| Gas | Temp., F. | Min. | 17 Min. | 30 Min. | 60 Min. | | |
| (Control) | | | 16 | 22 | 32 | 92 | 10.0 |
| $H_2$ | 900 | 30 | 36 | 41 | 42 | 95 | 5.2 |
| $H_2$ | 1,100 | 30 | 45 | 46 | 42 | 97 | 1.4 |
| $H_2$ | 1,100 | 30 | 44 | 45 | 1 40 | 97 | 2.0 |
|  |  |  |  |  |  | 1 99 | 1 0.7 |
| $H_2$–$N_2$ [2] | 1,100 | 15 | 46 | | | 92 | 4.4 |
| CO | 800 | 15 | 40 | 47 | 49 | 95 | 5.1 |
| CO | 1,100 | 60 | 53 | 53 | | 94 | 7.2 |
| $H_2$ [3] | 1,100 | 30 | 45 | | | 96 | 1.6 |
| CO | 1,100 | 30 | | | | | |

[1] Increased space rate from 70 to 120 WHSV.
[2] A mixture of $H_2$–$N_2$.
[3] Sequential hydrogen and CO treatment.

| | Temp., °F. | | | | | |
|---|---|---|---|---|---|---|
| | 500 | 500 | 500 | 500 | 600 | 600 |
| Time (minutes) | 15 | 30 | 45 | 60 | 75 | 90 |
| Ethylene | 7.2 | 7.7 | 7.9 | 7.6 | 7.0 | 6.9 |
| Propane | 40.4 | 38.4 | 38.1 | 38.5 | 42.1 | 41.5 |
| Proylene | 32.5 | 34.8 | 35.6 | 35.7 | 28.9 | 29.2 |
| 1-butene | 3.7 | 3.1 | 3.0 | 3.0 | 5.8 | 5.8 |
| trans-2-butene | 10.0 | 9.7 | 9.4 | 9.3 | 9.8 | 10.1 |
| cis-2-butene | 6.3 | 6.2 | 6.0 | 5.8 | 6.3 | 6.5 |
| Conversion, percent | 45.5 | 43.5 | 42.5 | 42.0 | 50.1 | 50.5 |

These data show that the process utilizing this catalyst is very effective in the 500–600° F. temperature range and at a high throughput rate.

Porous and nonporous silica, free of molybdenum and tungsten, effect propylene disproportionation to the extent of 1 percent or less at 1000° F.

Example VI

Both fresh and used $WO_3$–$SiO_2$ catalysts were activated, treated with hydrogen, and then tested in a propylene disproportionation reaction. The catalysts were activated in air and then subjected to a stream of hydrogen for 5 hours at 1100° F. The fresh catalysts contained about 6.9 weight percent tungsten oxide. The used catalyst was one which had previously gone through 110 regeneration cycles in a period of about one year. It contained about 8 weight percent tungsten oxide. Other conditions and the results of the tests are shown in the table below. The results of non-hydrogen treated catalysts in runs carried out under essentially comparable conditions are also shown for comparison.

| | Normal Activation | | Hydrogen Treatment | |
|---|---|---|---|---|
| | Fresh Cat. | Used Cat. | Fresh Cat. | Used Cat. |
| Temperature | 805 | 800 | 810 | 800 |
| Pressure, p.s.i.g | 450 | 450 | 450 | 450 |
| Space rate, WHSV | 50 | 100 | 70 | 40 |
| Conversion, percent | 40.5 | 38.8 | 36.0 | 38.9 |
| Selectivity, percent | 77 | 94 | 99.4 | 100.0 |

The data above show that the hydrogen treatment results in improvement in selectivity with both fresh and much-used $WO_3$–$SiO_2$ catalysts.

Example VII

A number of catalyst reduction runs were carried out under different conditions with both hydrogen and carbon monoxide as treating agents.

The data in the above table show that hydrogen treatment at 900–1100° F. for 15–30 minutes is very effective in reducing the induction period for the regenerated catalyst and in increasing the selectivity of the process to desired products, namely, ethylene and butenes. It is also seen that the treatment reduces the quantity of 1-butene produced. The hydogen treating gas can be diluted with an inert gas such as nitrogen.

Treatment with carbon monoxide was also found to reduce the induction period and to increase the selectivity by a smaller amount. Sequential treatment with $H_2$ followed by CO improved both the activity and the selectivity.

Example VIII

A hydrogen treated catalyst was tested in an extended run. A catalyst containing about 8 weight percent tungsten oxide was treated for 1 hour with an equivolume mixture of hydrogen and nitrogen for 1 hour at 1100° F. and 500 gaseous hourly space velocity. It was then used in a fixed-bed propylene disproportionation operation carried out at 800° F., 450 p.s.i.g., and a weight hourly space velocity of 60. The results of this run were compared with those of a subsequent run in which the same catalyst was regenerated and reused but without the benefit of the hydrogen treatment.

The run with the hydrogen treated catalyst lasted 72 hours and the conversion did not drop below 40 percent until after the 60th hour. The coke content of the catalyst at the completion of the cycle was 55 percent of the weight of the catalyst.

The run using the non-hydrogen treated catalyst lasted 50 hours and the conversion fell below 40 percent after the 48th hour. The weight of the coke was 88 percent of the weight of the catalyst.

Another difference between these two runs, particularly during the first 24 hours of each run, was in the amount of butene-1 and pentenes formed. The run with the hydrogen treated catalyst produced practically none of these latter two materials.

Example IX 8.8 parts by weight of a tungsten oxide-silica catalyst (containing 6.8 weight percent tungsten oxide, a pore diameter of 114 angstroms, a pore volume of 0.98 cc./g., and a surface area of 345 m.²/g.) was charged into a tubular stainless steel reactor. The catalyst bed was activated at 1000° F. for 2 hours with flowing air. The bed was then flushed with nitrogen several times and then treated with flowing hydrogen for 30 minutes while still at 1000° F. The catalyst bed was again flushed with nitrogen and cooled. Heptene-3 was passed over this catalyst at 400 p.s.i.g., at a weight hourly space velocity of 18.3, and at 650, 700, and 750° F. The reactor was operated for 15 minute periods at each of these temperatures and the effluent was collected and analyzed. The analysis is shown in the following table.

For purposes of comparison, heptene-3 was similarly disproportionated under the same conditions except that the catalyst was not given the hydrogen treatment. The results of this test are also seen in the following table.

REACTOR EFFLUENT ANALYSIS [Weight percent]

| Olefins | $WO_3$-$SiO_2$ | | | $WO_3$-$SiO_2$ (hydrogen-treated) | | |
|---|---|---|---|---|---|---|
| | 650° F. | 700° F. | 750° F. | 650° F. | 700° F. | 750° F. |
| $C_3$ | 0.09 | 0.12 | 0.27 | 0.09 | 0.29 | 0.84 |
| $C_4$ | 0.27 | 0.75 | 1.26 | 0.82 | 1.49 | 3.54 |
| $C_5$ | 0.72 | 1.40 | 3.00 | 2.04 | 3.07 | 7.16 |
| $C_6$ | 1.40 | 2.18 | 4.91 | 3.64 | 4.48 | 11.12 |
| $C_7$ | 91.19 | 87.70 | 75.22 | 83.20 | 77.14 | 48.58 |
| $C_8$ | 1.68 | 2.77 | 5.24 | 4.20 | 5.32 | 10.77 |
| $C_9$ | 0.99 | 1.87 | 3.98 | 2.77 | 3.67 | 7.65 |
| $C_{10}$ | 0.75 | 1.31 | 2.55 | 1.60 | 2.31 | 5.35 |
| $C_{11}$ | 0.36 | 0.53 | 1.62 | 0.70 | 1.16 | 1.11 |
| $C_{12}$ | 0.06 | 0.16 | 0.60 | 0.29 | 0.37 | 1.28 |
| $C_{13}$ | 2.49 | 1.27 | 1.14 | 0.64 | 0.72 | 0.76 |
| $C_{14}$ | | | 0.21 | | | 0.35 |
| $C_{15}$ | | | | | | 0.18 |
| $C_{16}$ | | | | | | |
| Residue, wt. percent | 0.99 | 0.15 | 0.52 | 0.22 | 0.48 | 1.13 |
| Conversion, percent | 8.81 | 12.30 | 24.88 | 16.80 | 22.8 | 50.7 |

This example shows that the hydrogen treatment greatly increased the rate of reaction as indicated by the higher conversion obtained.

*Example X*

Using the same catalyst and essentially the same apparatus and technique as that of Example IX, n-pentenes and n-heptenes were converted to other olefins in runs in which the catalyst was treated with carbon monoxide. The catalyst was first activated in flowing air (5000 v./v./hr.) for 1 hour at 1100° F. and then was treated with carbon monoxide (2000 v./v./hr.) at 1100° F. for 30 minutes. For purposes of comparison, these olefins were also converted over another portion of the same catalyst which had been given the carbon monoxide treatment. The results and essential conditions of these tests are shown in the following table.

| | n-Pentenes [1] | | n-Heptenes [2] | |
|---|---|---|---|---|
| | CO-treated | Non CO-treated | CO-treated | Non CO-treated |
| Reaction temp., ° F | 750 | 750 | 750 | 750 |
| Reaction press., p.s.i.g | 100 | 100 | 10 | 10 |
| Weight hourly space velocity | 70 | 70 | 40–50 | 40–50 |
| Reactor Effluent, wt. percent: | | | | |
| Ethylene | 0.0 | 0.0 | Trace | Trace |
| Propylene | 3.5 | 1.5 | 0.3 | 0.2 |
| Butenes | 20.7 | 10.4 | 4.8 | 2.9 |
| Pentenes | 35.2 | 71.7 | 9.8 | 6.0 |
| Hexenes | 24.0 | 12.1 | 15.0 | 10.0 |
| Heptenes | 10.0 | 3.3 | 26.2 | 50.5 |
| Octenes | 5.7 | 0.9 | 17.5 | 12.6 |
| Nonenes | 0.7 | 0.1 | 13.6 | 9.5 |
| Decenes | 0.2 | 0.0 | 7.8 | 5.8 |
| Undecenes | | | 3.3 | 1.7 |
| Dodecenes | | | 1.2 | 0.6 |
| Tridecenes | | | 0.4 | 0.2 |
| Conversion, percent | 64.8 | 28.3 | 73.8 | 49.5 |

[1] Substantially an equilibrium mixture of pentene-1 and pentene-2 at 750° F. (about a 13:87 ratio, respectively).
[2] Substantially an equilibrium mixture of heptene-1, heptene-2, and heptene-3 at 758° F. (about a 1:6:3 ratio, respectively).

These data show that treatment of the catalyst with carbon monoxide greatly increases the conversion rate of n-pentenes and n-heptenes.

Reasonable variation and modification are possible within the scope of this invention which sets forth a process and catalysts for converting propylene to ethylene and butenes.

I claim:
1. A process which comprises disproportionating at least one aliphatic monoolefin having from 3 to 20 carbon atoms per molecule to form olefins having greater and lesser numbers of carbon atoms per molecule by contacting said olefin with a catalyst activated in an atmosphere compatible with said catalyst to permit activation to disproportionation, said catalyst comprising a silica containing base wherein the amount of any alumina in said base is less than a preponderant amount and at least one oxide selected from the group consisting of molybdenum oxide and tungsten oxide under conditions, including conditions of temperature, pressure and contact time, suitable for obtaining a disproportionated product said temperature being in the range of 400–1100° F.

2. The process of claim 1 wherein said conditions include a pressure in the range of 0 to 1500 p.s.i.g. and a space rate at reaction conditions in the range of 0.1 to 1000 vol./vol./min.

3. The process of claim 2 wherein said oxide is tungsten oxide and said temperature is in the range of 600° to 900° F.

4. The process of claim 1 wherein said activation includes contact with at least one reducing gas at a temperature in the range of 600–1500° F.

5. The process of claim 4 wherein said reducing gas is selected from the group consisting of carbon monoxide and hydrogen.

6. The process of claim 2 wherein the alumina content of said base is below about 1 percent by weight.

7. The process of claim 1 wherein the amount of said one oxide is in the range from 0.1 percent to 30 percent by weight of the catalyst.

8. The process of claim 2 wherein said oxide is molybdenum oxide and said temperature is in the range of 800 to 1100° F.

9. The process of claim 3 wherein said base is a high purity silica containing less than about 1 percent by weight of alumina, and said oxide is present in an amount in the range of 0.1 percent to 30 percent by weight of the catalyst.

References Cited

UNITED STATES PATENTS

| | | | |
|---|---|---|---|
| 2,614,137 | 10/1952 | Chenicek | 260—683.15 |
| 2,968,612 | 1/1961 | Loughran et al. | 208—136 |
| 3,261,879 | 7/1966 | Banks | 260—683 |

PAUL M. COUGHLAN, Jr., *Primary Examiner.*

DELBERT E. GANTZ, *Examiner.*

C. E. SPRESSER, *Assistant Examiner.*